United States Patent [19]

Ona et al.

[11] 4,228,054
[45] Oct. 14, 1980

[54] ORGANOPOLYSILOXANE LATEX COMPOSITIONS

[75] Inventors: Isao Ona, Sodegauramachi; Masaru Ozaki; Katsutoshi Usui, both of Ichihara, all of Japan

[73] Assignee: Toray Silicone Company, Ltd., Tokyo, Japan

[21] Appl. No.: 12,995

[22] Filed: Feb. 21, 1979

[30] Foreign Application Priority Data

Apr. 5, 1978 [JP] Japan .................................. 53/39119

[51] Int. Cl.$^2$ .............................................. C08L 83/06
[52] U.S. Cl. ..................... 260/29.2 M; 260/29.6 NR; 260/29.7 R; 428/391
[58] Field of Search .................. 260/29.2 M, 29.2 EP; 525/477

[56] References Cited

U.S. PATENT DOCUMENTS

| | | | |
|---|---|---|---|
| 2,891,920 | 6/1959 | Hyde et al. | 260/29.2 M |
| 3,624,017 | 11/1971 | Sorkin | 260/29.2 M |
| 3,706,695 | 12/1972 | Huebner et al. | 260/29.2 M |
| 3,817,894 | 6/1974 | Butler et al. | 260/29.2 M |

FOREIGN PATENT DOCUMENTS 1024024 3/1966 United Kingdom .

OTHER PUBLICATIONS

Chem. Abstracts, vol. 77 (Japan 71 41,038) 1972, 6061g.

*Primary Examiner*—Theodore E. Pertilla
*Attorney, Agent, or Firm*—Robert L. McKellar

[57] ABSTRACT

What is disclosed are organopolysiloxane latex compositions which are crosslinked by organofunctional silanes which compositions are useful for binding fiberglass fibers. Such compositions are, for example, N-(β-aminoethyl)-γ-aminopropyltrimethoxysilane crosslinked dimethylpolysiloxanes which have been prepared in emulsion using octamethylcyclotetrasiloxane and octylbenzenesulfonic acid.

8 Claims, No Drawings

ORGANOPOLYSILOXANE LATEX COMPOSITIONS

BACKGROUND OF THE INVENTION

This invention deals with organopolysiloxane latex compositions which are crosslinked by organofunctional trialkoxysilanes.

Many methods are known for the preparation of organopolysiloxane emulsions. These emulsions are used for mold releasing agents, components of paint, fiber and fabric treating agents, antifoaming agents and glossing agents.

The methods of preparation of such emulsions are known to those skilled in the art. Generally, those emulsions are classified as latices because they are equivalent in character to organic resins that are dispersed in water using surfactants. For example, U.S. Pat. No. 2,891,920 describes a method where an organosiloxane emulsified in water by means of emulsifiers is polymerized with strong mineral acids or strong alkali catalysts. British Pat. No. 1,024,024 describes a method in which an organosiloxane emulsified in water with a benzenesulfonic acid or an alkylbenzenesulfonic acid is polymerized by heating. Japanese Patent Publication 71/41038 proposes a method in which organosiloxanes emulsified in water with a polyoxyethylene sulfuric acid ester is polymerized by heating. Furthermore, the above-mentioned British Pat. No. 1,024,024 describes a method in which emulsion polymerization is conducted with the addition of small amounts of alkoxysilanes such as methyltrimethoxysilane, methyltriethoxysilane, vinyltrimethoxysilane and phenyltrimethoxysilane. Japanese Patent Publication 71/41038 describes a method in which emulsion polymerization is conducted with the addition of a small amount of phenyltriethoxysilane.

The organopolysiloxane latex compositions obtained by the above described methods are especially useful for imparting softness, wettability, water repellency and releasability to paper or natural or synthetic fibers, or fiberglass or their knits and woven fabrics. However, these latex compositions do not impart adhesive bonding, or cohesive characteristics between fibers and in some cases even inhibit such characteristics, causing, in the case of knitted or woven fabrics, an unwanted texture. The addition of condensation catalysts such as organotin carboxylates, slightly increases adhesion and bonding strength. However, the increases in bonding strength are not necessarily good enough and the addition of the condensation catalysts causes other disadvantages such as shortening of the bath life and a decrease in the heat and water resistance after curing.

An attempt was made to resolve the disadvantages described above with the result that the materials of the invention herein have good stability which is especially useful for imparting interfiber adhesion bonding and converging characteristics to fibers.

Thus, the present invention concerns an organopolysiloxane latex composition which is a composition of matter which is a mixture of an organopolysiloxane obtained by polymerizing a cyclic organopolysiloxane in the presence of (A) an organofunctionaltrialkoxysilane; (B) a surfactant and, (C) water, wherein the cyclic organopolysiloxane before polymerization has the general formula

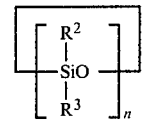

wherein $R^2$ and $R^3$ are independently selected from substituted or unsubstituted monovalent hydrocarbon radicals containing 1-10 carbon atoms and n has an average value of 3-6; the organofunctionaltrialkoxysilane has the general formula $(R'O)_3SiRX$ wherein $R'$ is a monovalent hydrocarbon radical containing less than 7 carbon atoms or is selected from the group consisting of $-CH_2OC_2H_5$ or $-CH_2CH_2OCH_3$, R is a divalent hydrocarbon radical containing no more than 12 carbon atoms, X is an organofunctional radical selected from the group consisting of $-NH_2$, $-CH_2CH_2NH_2$, $-(CH_2)_4NH_2$, N-cyclohexylamino, N-phenylamino, N-aminoethylamine, N,N-dimethylamino, glycidyl, 3,4-epoxycyclohexyl, mercapto or methacrylo.

The cyclic organosiloxanes used for the organopolysiloxane of this invention can be expressed by the general formula

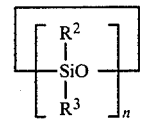

where $R^2$ and $R^3$ are identical or different substituted or unsubstituted monovalent hydrocarbon groups, and n is an integer with an average value of 3-6. Examples of $R^2$ and $R^3$ are alkyl radicals such as methyl, ethyl and propyl; alkenyl groups such as vinyl, allyl and butadienyl; aryl radicals such as phenyl, xenyl and naphthyl; cycloalkyl radicals such as cyclohexyl; cycloalkenyl radicals such as cyclohexenyl; aralkyl radicals such as benzyl and alkaryl radicals such as tolyl, xylyl, and their substituted products. The cyclic siloxanes are commercially available and their preparation will not be elaborated on herein.

The organofunctionaltrialkoxysilanes, component (A) of this invention are well-known silanes and are commercially available. They have the general formula $(R'O)_3SiRX$ wherein $R'$ is a monovalent hydrocarbon radical containing less than 7 carbon atoms or is selected from the group consisting of $-CH_2OC_2H_5$ or $-CH_2CH_2OCH_3$, R is a divalent hydrocarbon radical containing no more than 12 carbon atoms, X is an organofunctional radical selected from the group consisting of $-NH_2$, $-CH_2CH_2NH_2$, $-(CH_2)_4NH_2$, N-cyclohexylamino, N-phenylamino, N-aminoethylamine, N,N-dimethylamino, glycidyl, 3,4-epoxycyclohexyl, mercapto and methacrylo.

Examples of R in this invention are methylene, ethylene, propylene, butylene, hexylene, phenylene, xenylene, naphthylene, cyclohexylene, benzylidene, tolylene, and xylylene. Specific examples of $R^1$ are methyl, ethyl, propyl, butyl, hexyl, cyclohexyl, ethoxymethoxy and methoxyethoxy.

Specific examples of Component (A) are β-aminoethyltrimethoxysilane, β-aminoethyltriethoxysilane, β-aminoethyltriisopropoxysilane, γ-aminopropyltrimethoxysilane, γ-aminopropyltriethoxysilane, γ-aminopropyltri-n-propoxysilane, γ-aminopropyltri-n-butoxysilane, δ-aminobutyltrimethoxysilane, ε-aminohexyltriethoxysilane, 4-aminocyclohexyltriethoxysilane, 4-aminophenyltrimethoxysilane, N-aminoethyl-γ-aminopropyltrimethoxysilane, N-aminoethyl-γ-aminopropyltriethoxysilane, N-aminoethyl-γ-aminopropyltricyclohexoxysilane, β-glycidoxyethyltrimethoxysilane, β-glycidoxyethyltriethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, γ-(3,4-epoxycyclohexyl)propyltriethoxysilane, γ-mercaptopropyltrimethoxysilane, γ-mercaptopropyltriethoxysilane, γ-methacryloxypropyltrimethoxysilane, and γ-methacryloxypropyltriethoxysilane.

This component is indispensable for the composition of this invention and serves to adhere and bind the fibers to each other. Ordinary organotrialkoxysilanes having no organofunctional groups such as amino or epoxy groups exhibit only weak adhesion and bonding. The use of trialkoxysilanes in the present invention gives extremely strong adhesion and binding.

Component (A) is most effective when added to the cyclic organosiloxane, component (B) and component (C), the water before the emulsion is polymerized. The addition of component (A) after the emulsion polymerization is not likely to result in the strong adhesion and binding intended by the present invention. The reason for this is interpreted to be a result of the dealcoholation condensation between the silanol groups at both ends of diorganopolysiloxane produced as a result of the ring-opening polymerization of the cyclic organopolysiloxane and one or two of the alkoxy groups of component (A), which as a result produces an organopolysiloxane substituted at both ends with the functional group in addition to the two alkoxy groups from component (A). In addition, a modified organopolysiloxane in which, in addition to being substituted at both ends as above, has silicon atoms within the organopolysiloxane main chain substituted by one alkoxy group and the organofunctional group of component (A).

The amount of component (A) used in this invention is 0.1–30 parts by weight, preferably 1–15 parts by weight relative to 100 parts by weight of the organopolysiloxane. When this amount is too small, the adhesion and bonding between fibers achieved by the composition of this invention is decreased. If the amount is too large, the alcohol by-product from the hydrolysis of the alkoxy groups of the silane decreases the stability of the emulsion.

Component (B) acts as catalyst for polymerizing the cyclic organopolysiloxane. At the same time, it also plays the role of surfactant necessary for the formation of the emulsion. However, some types of surfactants such as quaternary ammonium salt surfactants, have low catalytic activity and require the additional use of alkaline catalysts such as sodium hydroxide or potassium hydroxide, which are usually used for polymerizing cyclic organopolysiloxanes.

Sulfonic acid surfactants useful in this invention are selected from the compounds having the general formula $R^4C_6H_4SO_3H$ and the general formula $R^5O(C_2H_4O)_mSO_3H$ wherein $R^4$ is an aliphatic monovalent hydrocarbon group having at least 6 carbon atoms, $R^5$ is an aliphatic monovalent hydrocarbon group having at least 6 carbon atoms or an aryl group substituted by an aliphatic monovalent hydrocarbon group having at least 6 carbon atoms, and m has an average value of 1 to 15. Specific examples of the sulfonic acids are hexylbenzenesulfonic acid, octylbenzenesulfonic acid, decylbenzenesulfonic acid, dodecylbenzenesulfonic acid, cetylbenzenesulfonic acid, myristylbenzenesulfonic acid, $CH_3(CH_2)_6CH_2O(C_2H_4O)_2SO_3H$, $CH_3(CH_2)_8CH_2O(C_2H_4O)_3SO_3H$, $CH_3(CH_2)_{10}CH_2O(C_2H_4O)_4SO_3H$ and $CH_3(CH_2)_2CH_2-C_6H_4O(C_2H_4O)_2SO_3H$. In addition, naphthylphosphonic acids with long chain alkyl substituents can also be used.

The quaternary ammonium salt surfactants useful in this invention are those having the following general formula:

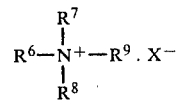

wherein $R^6$ is an aliphatic monovalent hydrocarbon group having at least 6 carbon atoms, $R^7$-$R^9$ are monovalent organic groups; and X is a halogen atom. Specific examples of the quaternary ammonium salts are octyltrimethylammonium chloride, dodecyltrimethylammonium chloride, hexadecyltrimethylammonium chloride, octyldimethylbenzylammonium chloride, decyldimethylbenzylammonium chloride, didodecyldimethylammonium chloride and dioctadecyldimethylammonium chloride.

Component (B) is used in the amount required to emulsify the cyclic organopolysiloxane and component (A). Usually the amount is within a range of 0.5–20 parts by weight relative to 100 parts by weight of the organopolysiloxane.

Water as component (C) is used in the amount required for the emulsion polymerization. Although the amount is not particularly restricted, it is usually 100–500 parts by weight relative to 100 parts by weight of the organopolysiloxane.

In order to produce a composition of the present invention, the following steps can be taken. Component (B), a sulfonic acid surfactant or a quaternary ammonium salt surfactant, and, if necessary, an alkali catalyst such as potassium hydroxide are added to component (C), the water, and dissolved. Next, the cyclic organosiloxane and component (A), the silane are added to this solution with stirring. The mixture is then passed through an emulsifying apparatus, such as a homogenizer, a colloid mill, a line mixer or some other convenient emulsifying apparatus. When the resulting milky turbid liquid is mixed under heat at 70°–90° C. for 1–10 hours, a high molecular weight organopolysiloxane latex composition is obtained. After the product is cooled, a neutralization is preferably carried out, alkaline in the case of sulfonic acid surfactant use, and acidic in the case of quaternary ammonium salt surfactant use.

Dyes, preserving agents, styrene-butadiene rubber emulsions, acrylonitrile butadiene rubber emulsions, chloroprene rubber emulsions and other rubber emulsions may be added to the composition of this invention. In addition, polydimethylsiloxane oil having both ends of the polymer molecule blocked by trimethylsilyl groups, silicone resins having trimethylsiloxane units and $SiO_{4/2}$ units as well as surfactants not specified in this invention, which are added for further increasing the storage stability and solution stability, can also be used as secondary additives.

The compositions of the present invention obtained by the above-mentioned method can be used as releasing agents, components for paints, fiber-treating agents, fiberglass treating agents, antifoaming agents and glossing agents among other uses. In addition, they are especially useful when used with natural and synthetic organic fibers and their woven knit, and especially non-woven fabrics, inorganic fibers such as fiberglass, asbestos, rockwool and their woven and knit fabrics, for improving the adhesion and bonding characteristics between the fibers.

In order to obtain the above-mentioned effects, the above-mentioned materials are impregnated with a composition of the present invention, and, if necessary, such steps as heat-drying and other steps which are usually used for treating fibers are also used.

This invention will be explained with experimental examples below. In the following examples, "parts" indicates "parts by weight".

EXAMPLE 1

To a homogeneous solution of dodecylbenzenesulfonic acid (3 parts) in water (55 parts), a separately prepared mixture of octamethylcyclotetrasiloxane (40 parts) and γ-glycidoxypropyltrimethoxysilane (2 parts) was added. The mixture was then passed twice through a homogenizer emulsifying apparatus at 450 kg/cm² pressure. The obtained milky turbid liquid was heated at 80° C. for 2 hours, and then maintained at 10° C. overnight. The composition was then neutralized with an aqueous solution of potassium hydroxide. This organopolysiloxane latex composition proved to be stable after storage for one month. After one month of standing, a portion of the milky turbid liquid was transferred to an aluminum dish and dried at 100° C. Upon being heated at 150° C. for 10 minutes, this material was converted to an elastic rubberlike silicone. Another sample of the organopolysiloxane latex composition was then diluted twofold with water. Fiberglass staple (100 parts) was then added to the diluted liquid (100 parts). After thorough stirring, the fiberglass staple was separated, spread over a flat board, and was slightly pressed to remove excess liquid. After 2 hours of drying at 100° C., the material was compression molded at 170° C. for 30 minutes. The obtained sheet had high strength, high elasticity, good heat resistance, and good mold releasability.

EXAMPLE 2

To a solution of hexadecyltrimethylammonium chloride (5 parts) in water (67 parts) was added a mixture of N-(β-aminoethyl)-γ-aminopropyltrimethoxysilane (3 parts) and octamethylcyclotetrasiloxane (25 parts) previously prepared in a separate container. After the pH of the obtained mixture was adjusted to 13 with potassium hydroxide, the mixture was passed twice through a colloid mill with an aperature of 10/1,000 inch. After being heated at 80° C. for 3 hours, cooled to 40° C., and left standing for 10 hours, the composition was neutralized with hydrochloric acid to obtain a milky turbid liquid. When a portion of this milky turbid liquid was transferred to an aluminum dish, dried at 100° C., and heated at 150° C. for 5 minutes, an elastic rubberlike silicone was obtained.

EXAMPLE 3

A solution of octylbenzenesulfonic acid (2 parts) in water (68 parts) was mixed, with stirring, with a mixture prepared in a separate container of octamethylcyclotetrasiloxane (25 parts), tetramethyltetravinylcyclotetrasiloxane (3 parts) and γ-mercaptopropyltrimethoxysilane (2 parts). The resulting mixture was passed twice through a homogenizer at 450 kg/cm². The liquid was then heated at 85° C. for 90 minutes, cooled to 20° C., and left standing for 7 hours. The liquid was then neutralized with sodium hydroxide. A portion of this milky turbid liquid was transferred to an aluminum dish, and, after being dried at 100° C., was heated at 150° C. for 10 minutes. As a result an elastic rubbery film was obtained.

That which is claimed is:

1. A composition of matter which is a mixture of an organopolysiloxane obtained by polymerizing a cyclic organopolysiloxane in the presence of
   (A) an organofunctionaltrialkoxysilane;
   (B) a surfactant and,
   (C) water,
   wherein the cyclic organopolysiloxane before polymerization has the general formula

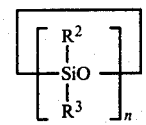

wherein $R^2$ and $R^3$ are independently selected from substituted or unsubstituted monovalent hydrocarbon radicals containing 1-10 carbon atoms and n has an average value of 3-6;

the organofunctionaltrialkoxysilane has the general formula $$(R'O)_3SiRX$$

wherein R' is a monovalent hydrocarbon radical containing less than 7 carbon atoms or is selected from the group consisting of —CH₂OC₂H₅ or —CH₂CH₂OCH₃, R is a divalent hydrocarbon radical containing no more than 12 carbon atoms, X is an organofunctional radical selected from the group consisting of —NH₂, —CH₂CH₂NH₂, —(CH₂)₄NH₂, N-cyclohexylamino, N-phenylamino, N-aminoethylamine, N,N-dimethylamino, glycidyl, 3,4-epoxycyclohexyl, mercapto or methacrylo.

2. A composition of matter as claimed in claim 1 wherein there is present 0.1–30 parts by weight of component (A), 0.5–20 parts by weight of component (B) and, 100 to 500 parts by weight of component (C), based on 100 parts of cyclic organopolysiloxane.

3. A composition of matter as claimed in claim 2 wherein component (A) is γ-glycidoxypropyltrimethoxysilane and component (B) is dodecylbenzene sulfonic acid.

4. A composition of matter as claimed in claim 3 wherein there is present 5 parts by weight of γ-glycidoxypropyltrimethoxysilane and 7.5 parts by weight dodecylbenzenesulfonic acid.

5. A composition of matter as claimed in claim 3 wherein the composition is neutralized with an aqueous solution of potassium hydroxide.

6. A composition of matter as claimed in claim 2 wherein component (A) is N-(β-aminoethyl)-γ-aminopropyltrimethoxysilane and component (B) is hexadecyltrimethylammonium chloride.

7. A composition of matter as claimed in claim 6 wherein the composition is neutralized with hydrochloric acid.

8. A composition of matter as claimed in claim 1 wherein (B) is selected from the group consisting of sulfonic acid surfactants and quaternary ammonium salt surfactants.

* * * * *